(12) United States Patent
Wang et al.

(10) Patent No.: US 9,169,771 B2
(45) Date of Patent: Oct. 27, 2015

(54) WASTEGATE VALVE POSITION CORRECTION

(71) Applicant: Ford Global Technologies, LLC, Dearborn, MI (US)

(72) Inventors: Yan Wang, Ann Arbor, MI (US); Gregory Patrick McConville, Ann Arbor, MI (US); Katherine Lapham, White Lake, MI (US); Todd Anthony Rumpsa, Saline, MI (US); Hamza Derbas, Boston, MA (US); Vladimir V. Kokotovic, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 14/032,971

(22) Filed: Sep. 20, 2013

(65) Prior Publication Data

US 2015/0082788 A1 Mar. 26, 2015

(51) Int. Cl.
*F02D 23/00* (2006.01)
*F02B 33/44* (2006.01)
*F02B 37/18* (2006.01)
*F02B 39/16* (2006.01)

(52) U.S. Cl.
CPC ............. *F02B 37/183* (2013.01); *F02B 37/186* (2013.01); *F02B 39/16* (2013.01)

(58) Field of Classification Search
CPC ........ F02B 37/16; F02B 37/18; F02B 37/183; F02B 37/186; F02B 2037/162; F02B 33/44; F02B 33/06; F01N 13/008
USPC ................. 701/100, 102; 60/611, 605.1, 602, 60/605.2, 607–608; 123/568.14, 568.21
See application file for complete search history.

(56) References Cited

U.S. PATENT DOCUMENTS

| | | | |
|---|---|---|---|
| 5,226,401 A * | 7/1993 | Clarke et al. ............. 123/568.14 |
| 2002/0100463 A1* | 8/2002 | Jaliwala et al. ............... 60/605.2 |
| 2004/0112053 A1* | 6/2004 | Yamada et al. ................. 60/602 |
| 2007/0227142 A1* | 10/2007 | Blaylock et al. ................ 60/602 |
| 2012/0312010 A1 | 12/2012 | Yasoshima |
| 2013/0011243 A1 | 1/2013 | Alajbegovic |

* cited by examiner

*Primary Examiner* — Thai Ba Trieu
*Assistant Examiner* — Deming Wan
(74) *Attorney, Agent, or Firm* — Julia Voutyras; Alleman Hall McCoy Russell & Tuttle LLP (57) ABSTRACT

Various methods for compensating a deflected linkage in a wastegate arrangement are provided. In one example, current is applied to an actuator to move a wastegate valve coupled through a linkage to the actuator for diverting gasses from a turbocharger. The position of the actuator is indicated, and a correction to said indicated actuator position is applied compensating for deflection of the linkage based at least on said applied current. Said applied current is adjusted when said corrected actuator position reaches a position corresponding to a desired valve position.

20 Claims, 7 Drawing Sheets

WASTEGATE VALVE POSITION CORRECTION

FIELD

The disclosure relates to a control of a wastegate in a turbocharger.

BACKGROUND AND SUMMARY

Some internal combustion engines utilize a compression device such as a turbocharger to increase engine torque/power output density. In one example, a turbocharger may include a compressor and a turbine connected by a drive shaft, where the turbine is coupled to an exhaust manifold side and the compressor is coupled to an intake manifold side of an engine. In this way, the exhaust-driven turbine supplies energy to the compressor to increase the pressure (e.g. boost, or boost pressure) in the intake manifold and to increase the flow of air into the engine. The boost may be controlled by adjusting the amount of gas reaching the turbine, for example with a wastegate. An actuator may be operatively coupled via a linkage to a wastegate valve and driven to position the wastegate valve to achieve the desired boost based on operating conditions. The actuator may be an electric actuator such as a motor with speed reduction gears, for example. A position sensor may provide feedback indicating the location of the wastegate valve relative to a valve seat. Depending on its location, the linkage may be subjected to significantly large forces, vibration, and temperatures.

In some approaches, a wastegate valve is located in a turbine housing with a wastegate arm extending outside the housing for controlling the wastegate. An actuator may be mounted a distance away from the turbine housing in order to avoid overheating the actuator. A linkage connects the actuator to the wastegate arm.

The inventors herein have recognized a problem with such approaches. In particular, linkages may deflect (e.g., bend) when subject to relatively high forces (e.g., actuator and/or exhaust forces). Linkage deflection may result in inaccurate wastegate valve positioning and thus inaccurate boost control.

Methods for compensating a deflected linkage in a wastegate arrangement are provided.

In one example, current is applied to an actuator to move a wastegate valve coupled through a linkage to the actuator for diverting gasses from a turbocharger. The position of the actuator is indicated, and a correction to said indicated actuator position is applied compensating for deflection of the linkage based at least on the applied current. The applied current is adjusted when the corrected actuator position reaches a position corresponding to a desired valve position.

In a more specific example, a correction for deflection of the linkage is retrieved from a stored data base created during previous test cycles and based on the applied current and temperature of the linkage.

In another aspect of the example, the correction was created using a test procedure comprising: increasing the applied current to move the valve to a fully closed position; after the valve is held in the closed position, further incrementing the applied current to cause deflection in the linkage, wherein a change in the indicated actuator position during the applied current incrementing step is stored as the correction for the deflection.

In still another example, the correction was created using a test procedure comprising: determining a fully closed position of the valve; when the valve is subsequently in an open position, issuing a closing command current to the actuator; inferring the actuator position based on the closing command current and the determined fully closed position; and creating the position correction based upon a difference between the inferred actuator position and the indicated actuator position.

In the examples described above, linkage deflection which would otherwise result in inaccurate wastegate valve positioning is compensated. Currents applied to an actuator may be controlled to move the actuator to a corrected position based on determined position corrections. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Compression devices such as a turbocharger may be used to increase the output of an internal combustion engine. A wastegate may in part regulate the boost pressure supplied to the engine by positioning a wastegate valve to thereby control the amount of exhaust gas reaching a turbine of the turbocharger. The wastegate valve may be positioned via an actuator with a linkage disposed therebetween. Deformation and/or deflection in the linkage, however, may prevent accurate wastegate valve positioning and thus accurate boost control. For example, actuator forces and exhaust forces acting on the linkage may cause the linkage to bend. In other scenarios, deflection may occur in the actuator itself and/or in a structure positioned between the wastegate valve and actuator mounting bosses. "Deflection" and "deformation" as used herein may refer to any or all of these scenarios. Compensating wastegate deflection in some examples may include compensating two or more constituent deflections.

Figure 1:
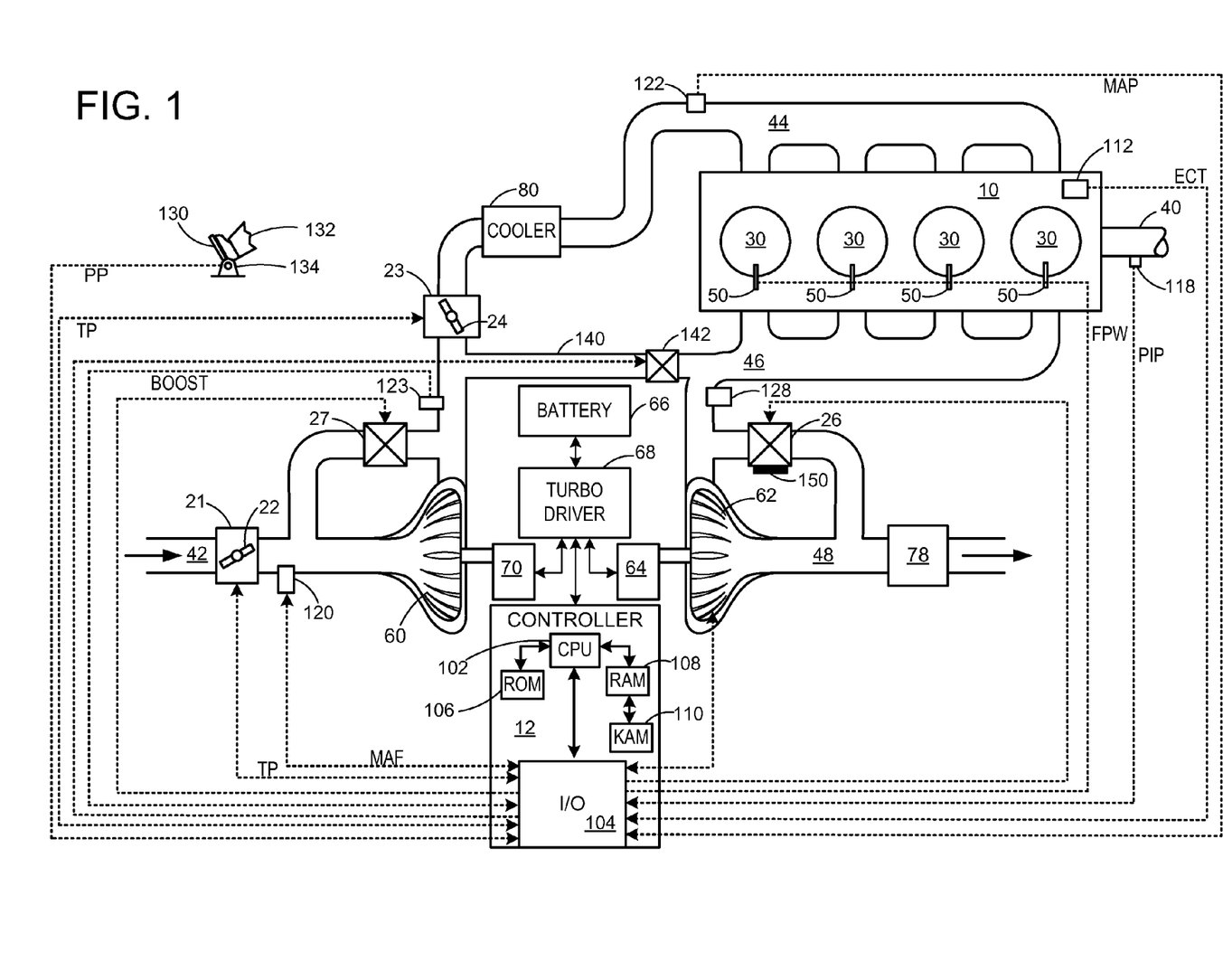
FIG. 1 shows a block diagram of a turbocharged engine including a wastegate.
Figure 2:
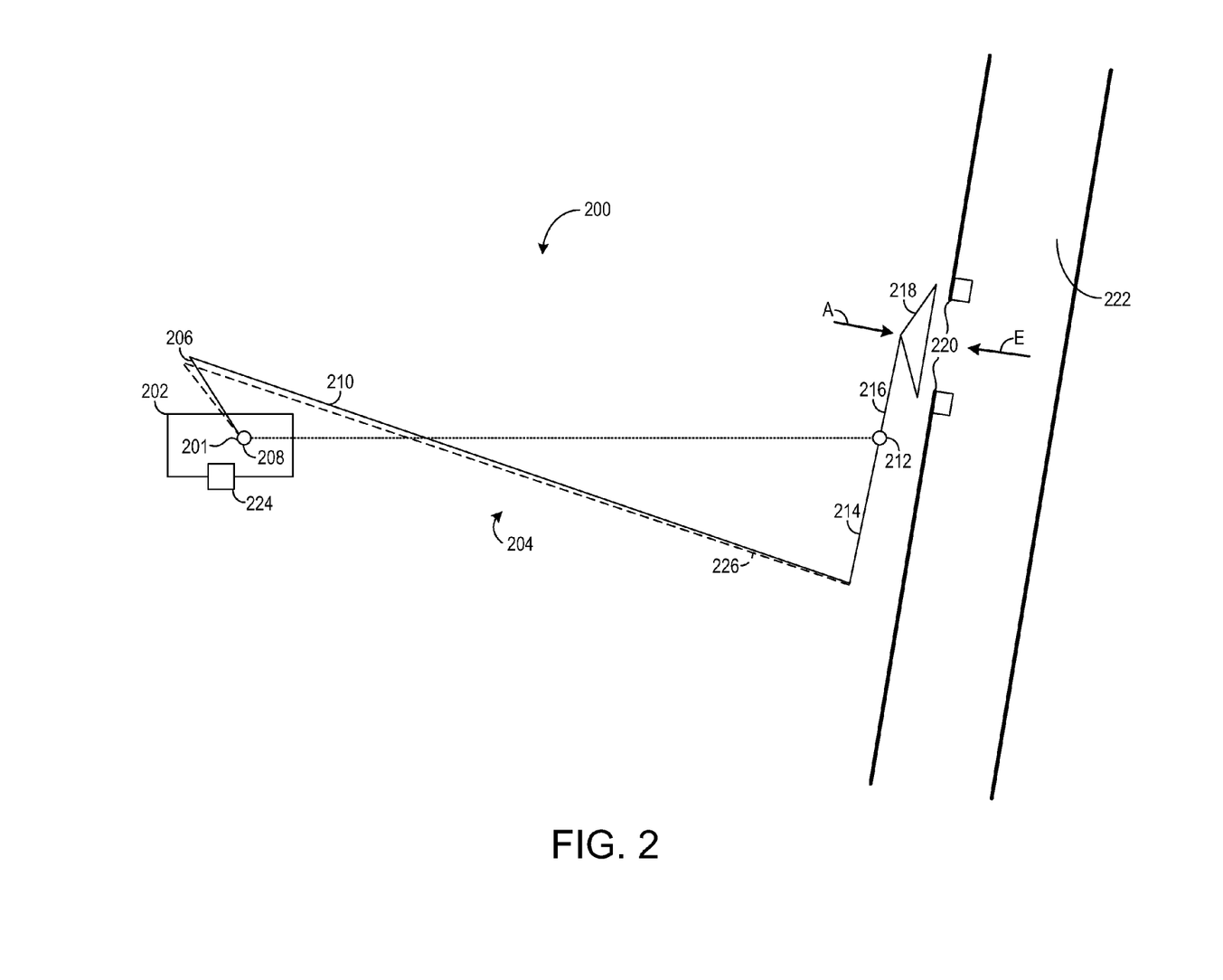
FIG. 2 shows an exemplary arrangement of the wastegate of FIG. 1.
Figure 3A:
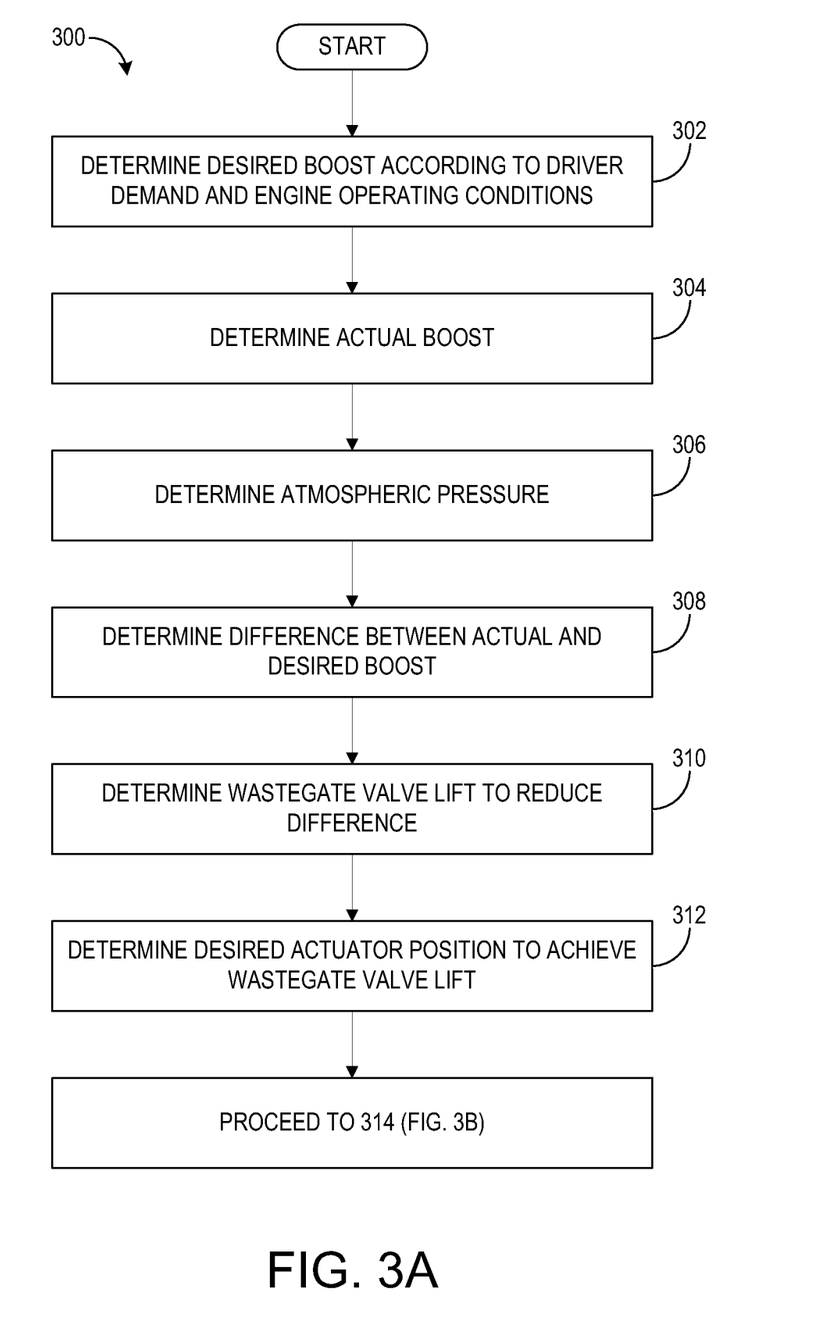
FIGS. 3A & 3B show a flowchart illustrating a method for controlling a turbocharger associated with the wastegate arrangement of FIG. 2.
Figure 3B:
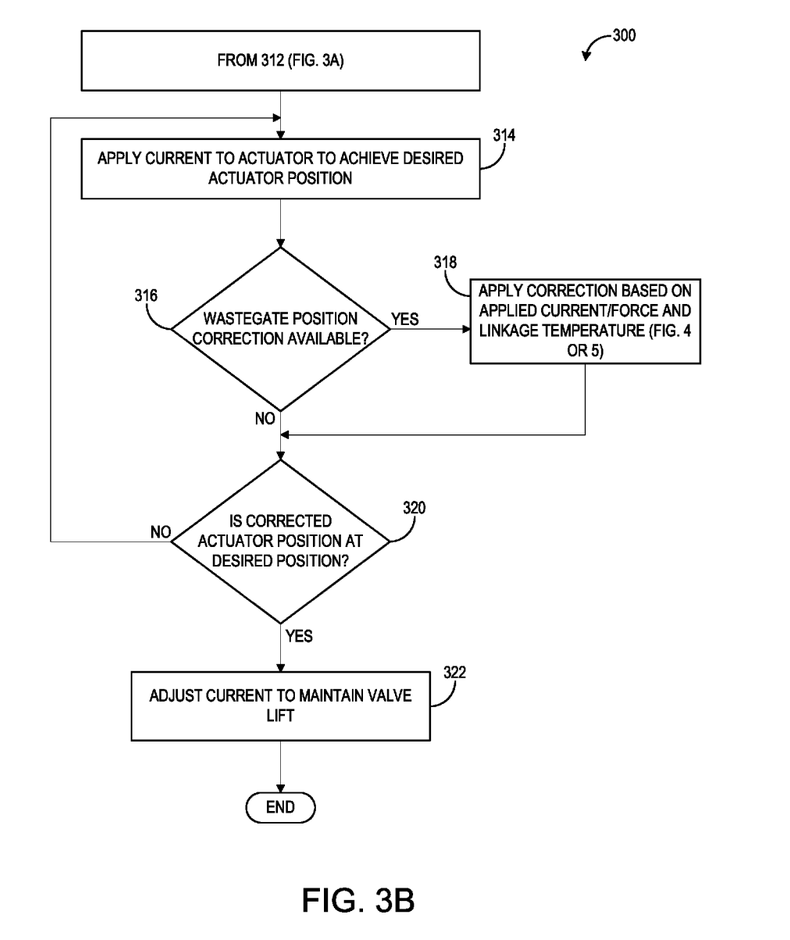
Figure 4A:
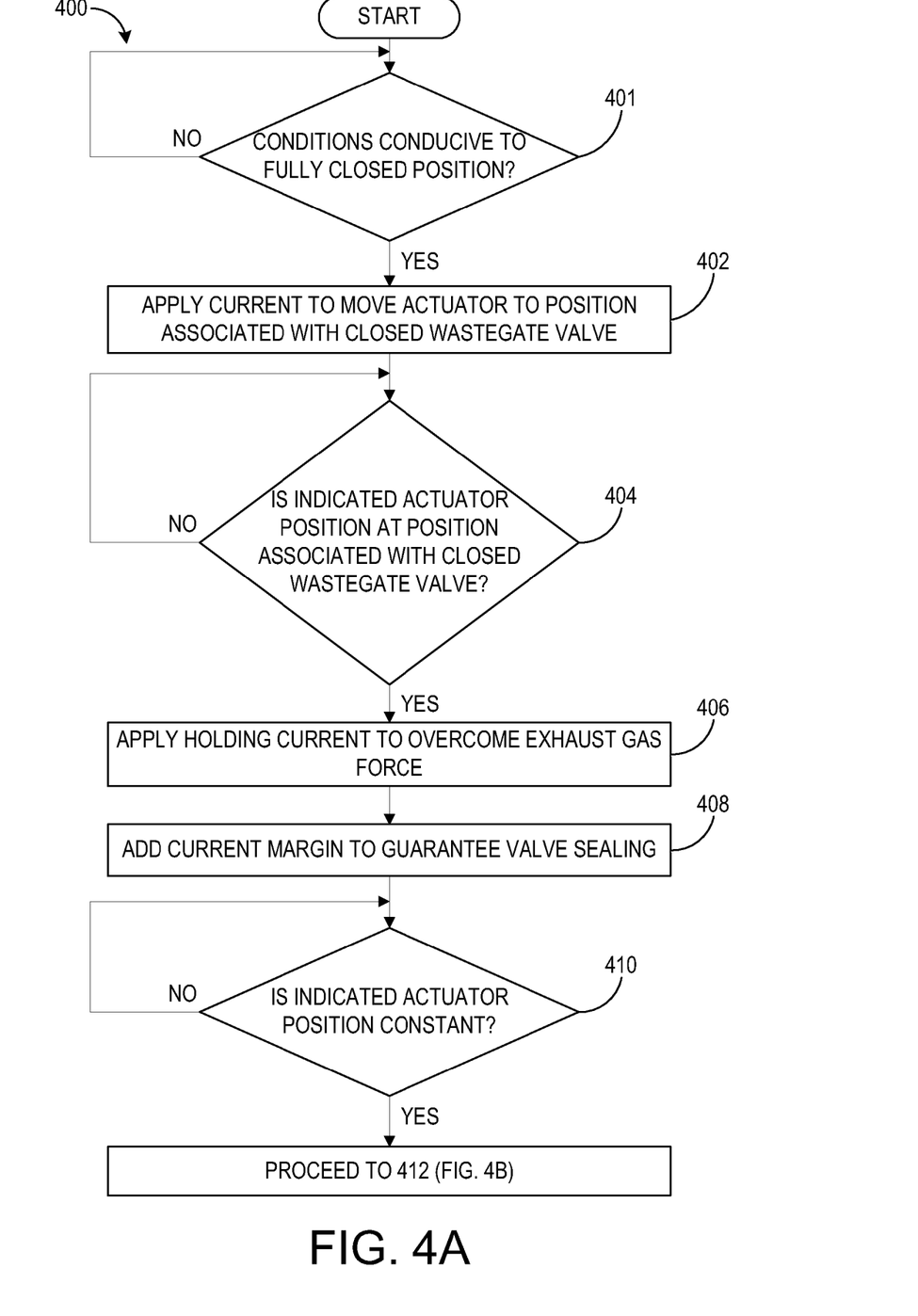
FIGS. 4A & 4B show a flowchart illustrating a method for compensating a deflected linkage in the wastegate arrangement of FIG. 2.
Figure 4B:
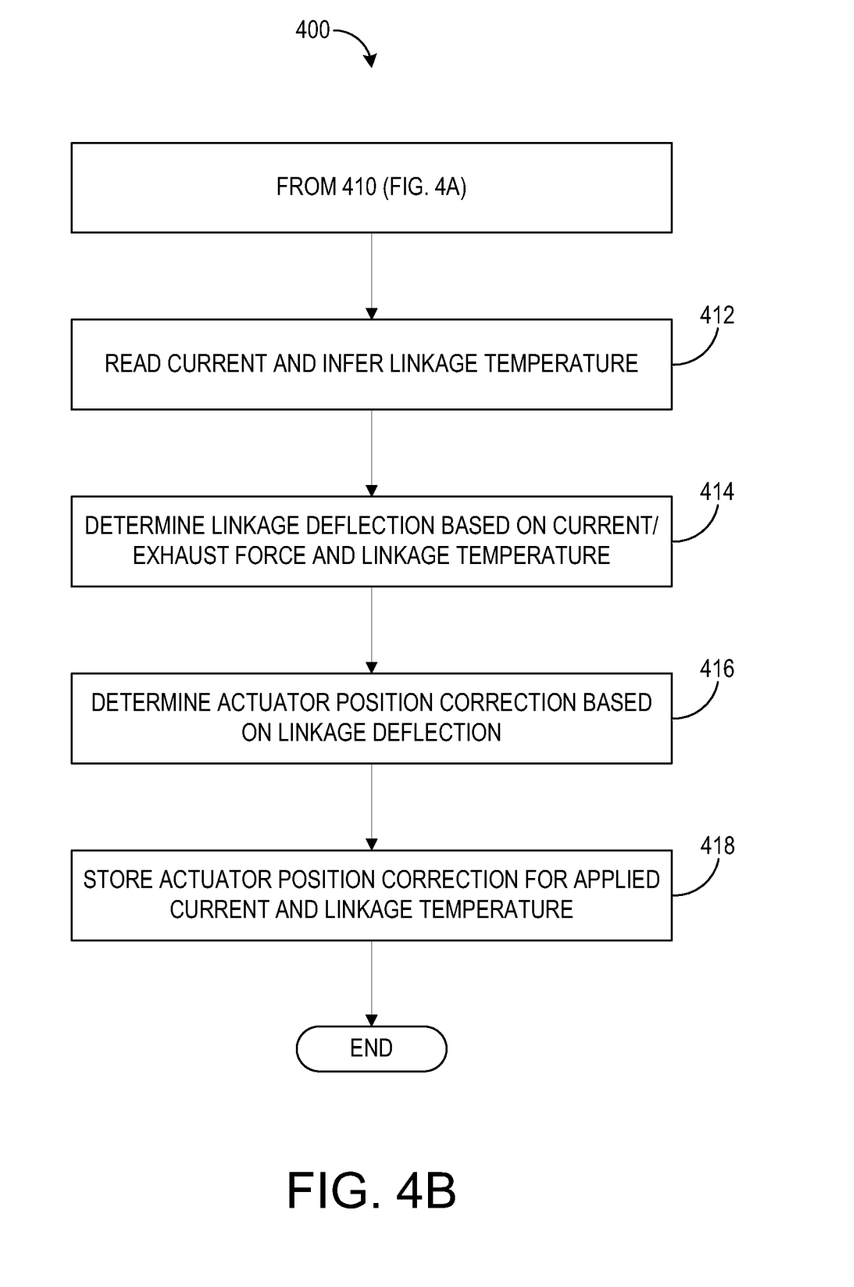
Figure 5:
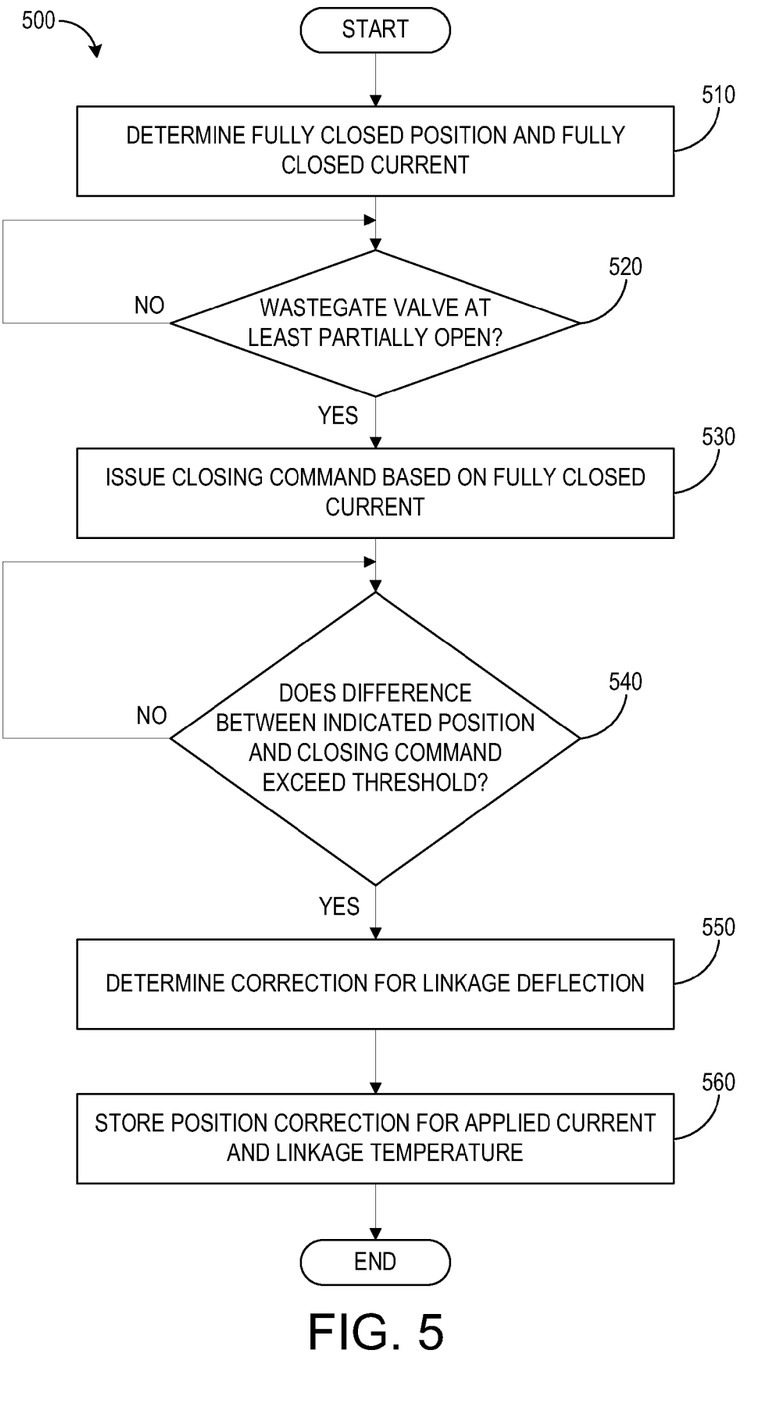
FIG. 5 shows a flowchart illustrating another method for compensating a deflected linkage in the wastegate arrangement of FIG. 2.

Various methods for compensating a deflected linkage in a wastegate arrangement are provided. In one example, current is applied to an actuator to move a wastegate valve coupled through a linkage to the actuator for diverting gasses from a turbocharger. The position of the actuator is indicated, and a correction to the indicated actuator position is applied compensating for deflection of the linkage based at least on the applied current. The applied current is adjusted when the corrected actuator position reaches a position corresponding to a desired valve position. FIG. 1 shows a block diagram of a turbocharged engine including a wastegate, FIG. 2 shows an exemplary arrangement of the wastegate of FIG. 1, FIGS. 3A and 3B show a flowchart illustrating a method for controlling a turbocharger associated with the wastegate arrangement of FIG. 2, FIGS. 4A and 4B show a flowchart illustrating a method for compensating a deflected linkage in the wastegate arrangement of FIG. 2, and FIG. 5 shows a flowchart illustrating another method for compensating a deflected linkage in the wastegate arrangement of FIG. 2. The engine of FIG. 1 also includes a controller configured to carry out the methods depicted in FIGS. 3-5.

FIG. 1 is a schematic diagram showing an example engine 10, which may be included in a propulsion system of an automobile. The engine 10 is shown with four cylinders 30. However, other numbers of cylinders may be use in accordance with the current disclosure. Engine 10 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 10 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 10.

Combustion chambers 30 may receive intake air from intake manifold 44 via intake passage 42 and may exhaust combustion gases via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 50 are shown coupled directly to combustion chamber 30 for injecting fuel directly therein in proportion to the pulse width of signal FPW received from controller 12. In this manner, fuel injector 50 provides what is known as direct injection of fuel into combustion chamber 30. The fuel injector may be mounted in the side of the combustion chamber or in the top of the combustion chamber, for example. Fuel may be delivered to fuel injector 50 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 22 and 24, respectively. In this particular example, the position of throttle plates 22 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 22 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gases from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, air-fuel ratio (AFR), spark retard, etc.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112, shown schematically in one location within the engine 10; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 10 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which, for example, may be an electric or a pneumatic actuator, for example. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gases. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 1 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

Turning now to FIG. 2, an exemplary wastegate arrangement 200 is shown. Wastegate 200 may be wastegate 26 in FIG. 1, for example. Wastegate 200 is operated by an actuator 202, which may be actuator 150 in FIG. 1. In this example, actuator 202 is an electric actuator including an electric motor, though other suitable actuators are possible (e.g., a solenoid). An output shaft 201 of actuator 202 is coupled to a linkage 204 and in particular a first link 206 of the linkage. As shown, linkage 204 in the illustrated embodiment is a four-bar, though various suitable linkages are possible including linear rods. Linkage 204 moves about two pivots including a first pivot 208 about which first link 206 and a second link 210 rotate, and a second pivot 212 about which a third link 214 and a fourth link 216 rotate. First, second, third, and fourth links 206, 210, 214, and 216 are commonly coupled to one another to form linkage 204 as a substantially contiguous member. At an end opposite actuator 202, linkage 204 is coupled at fourth link 216 to a wastegate valve 218, which may be positioned at a fully open position, a fully closed position, or anywhere therebetween, relative to a valve seat 220 disposed in a portion of an exhaust passage 222. Exhaust passage 222 may be exhaust manifold 46 of FIG. 1, for example. By positioning wastegate valve 218 in this continuously variable manner, the amount of exhaust gas reaching a turbine (e.g., turbine 62 of FIG. 1) of a turbocharger may be controlled. In this way, the boost pressure delivered to an engine such as engine 10 of FIG. 1 may be controlled. The position of wastegate valve 218 of wastegate 200 may be controlled via actuation of actuator 202 and placement of its output shaft 201, movements of which are translated to the exhaust valve via linkage 204.

As shown, wastegate 200 further includes a position sensor 224 which may be configured to measure the location of wastegate valve 218 based on changes in the angle of output shaft 201. In particular, the separation between a bottom surface of the wastegate valve and a top surface of valve seat 220 may be measured by position sensor 224 in the form of a valve lift. In other embodiments, however, the actuator may be a linear actuator that acts on third link 214 without pivot point 208. In such cases, position sensor 224 may sense the position of another component inside the actuator. Such measurements may be used to indirectly determine the position of wastegate valve 218. Moreover, in other embodiments the position of wastegate valve may be determined based on a soft model using one or more of the signals (e.g., BOOST) described above with reference to FIG. 1 and sent to controller 12.

FIG. 2 also illustrates how variation in the geometry (e.g., length) of linkage 204 may occur. In some scenarios, variation in the geometry of linkage 204 occurs due to high surrounding temperatures generated in part by hot exhaust gasses travelling through exhaust passage 222. As the temperature of linkage 204 varies, the linkage and its constituent links may expand or contract, for example. This may include variation in the distance between pivot points 208 and 212. As such, the accuracy of wastegate valve position sensing may decrease, resulting in accurate supply of boost to an engine.

Physical deformation or deflection may occur in linkage 204 for other reasons. At high loads (e.g., physical load on wastegate valve 218), for example, high exhaust pressures due to exhaust gas travelling through exhaust passage 222 act against the bottom surface of wastegate valve 218 in a direction substantially aligned to a direction E. To compensate for such exhaust forces, and to position wastegate valve 218 in a position ensuring the desired supply of boost to an engine, a substantially equal and opposite actuator force is transmitted to the top of the wastegate valve at the point at which fourth link 216 is joined thereto, through linkage 204 from actuator 202, and substantially aligned to a direction A. Being responsive to the high exhaust pressures and resulting significant exhaust forces, the actuator force may cause variation (e.g., expansion, contraction in length) in the geometry of linkage 204, which may be referred to herein as "deflection" or "deformation". Such deflection is represented by a deflected linkage 226 illustrated in broken lines. While the position of deflected linkage 226 is offset from linkage 204, both linkages correspond to the same valve position. It may accordingly be seen how position sensor 224 may detect two different linkage positions, and thus positions of wastegate valve 218, respective to linkage 204 and deflected linkage 226. Detection of two different wastegate valve positions when wastegate valve 218 is oriented at a single lift may occur for a plurality of deflected linkages compared to their non-deflected counterparts.

Linkage deformation may result in other errors in wastegate valve position tracking. For example, in some scenarios a deflected linkage may cause position sensor 224 to provide a detected position of wastegate valve 218 at a first physical lift. When wastegate valve 218 is physically positioned at a second physical lift, different from the first physical lift though in some examples relatively close, position sensor 224 may provide the same detected position. In other words, position sensor 224 in this example provides the same detected lift for two different actual, physical lifts. As in the scenario described above, inaccuracy in wastegate valve positioning may be introduced, causing the delivery of inaccurate boost levels to an engine.

In some wastegate assemblies such as wastegate 200, linkage deflection occurring to an extent which affects boost delivery at an unacceptable limit may begin to manifest above a threshold load at which forces (e.g., actuator and exhaust forces) above a force threshold are exerted on wastegate valve 218. It will be noted that in this context load refers to the physical load on wastegate valve 218 due to one or both of force imparted by actuator 202 and force imparted by exhaust flow through exhaust passage 222. As such, the methods described below may apply a compensation for linkage deflection above a wastegate valve load threshold.

It will be appreciated that wastegate 200 and various components therein may be modified without departing from the scope of this disclosure. For example, a current sensor and/or a force sensor may be included with actuator 202, in lieu of or in addition to position sensor 224. Current sensing may be facilitated via a sensor or probe, or in other examples may be calculated based on Ohm's law (or other relation) as the ratio of actuator voltage (e.g., terminal voltage) and actuator resistance, if these two quantities are known or can be measured and when a resistance/temperature lookup table is available. Further, as described above, other types of linkages may be provided to couple actuator 202 with wastegate valve 218, including but not limited to a linear rod.

Turning now to FIG. 3A, a flowchart illustrating a method 300 which may be executed by an engine controller (e.g., controller 12) for controlling a turbocharger via a wastegate (e.g., wastegate 200) is shown. In one example, a method of controlling a turbocharger of an engine via a wastegate may comprise determining a desired boost pressure and an actual boost pressure. The wastegate may be adjusted according to a difference between the desired boost pressure and the actual boost pressure.

At 302 the method includes determining a desired boost according to driver demand and engine operating conditions. The conditions assessed may be directly measured with sensors, such as sensors 112, 118, 120, 122, 123, and 134 for example, and/or the conditions may be estimated from other engine operating conditions. The assessed conditions may include engine coolant temperature, engine oil temperature, mass airflow (MAF), manifold pressure (MAP), boost (for example, BOOST pressure from sensor 123), engine speed, idle speed, barometric pressure, a driver-demanded torque (for example, from a pedal position sensor 134), air temperature, vehicle speed, etc.

Next, at 304, an actual boost pressure may be determined. The actual boost may be directly measured from a sensor, such as sensor 123. The measurement may be sent to controller 12 via the BOOST pressure signal and stored in a computer readable storage medium. In an alternative embodiment, the actual boost pressure may be estimated based on other operating parameters, such as based on MAP and RPM, for example.

Next, at 306, atmospheric pressure may be determined. For example, atmospheric pressure may be measured from the MAP sensor at engine start-up, and/or estimated based on operating conditions of the engine, including MAF, MAP, throttle position, etc. The measurement may be sent to controller 12 and stored in a computer readable storage medium. In an alternative embodiment, the atmospheric pressure may be estimated based on other operating parameters.

Next, at 308, a difference between the actual and desired boost is determined. An engine controller such as controller 12 may determine the difference, for example. In some examples, the difference may be determined by subtracting the desired boost from the actual boost.

Next, at 310, a wastegate valve lift is determined in order to reduce the difference between the actual and desired boost determined at 308. In some examples, the difference between the actual and desired boost, in addition to the current wastegate valve lift, is fed to a suitable control mechanism configured to determine a wastegate valve lift in order to reduce this difference. For example, the wastegate valve lift may be used as an input to wastegate dynamics. In some wastegate actuators, the wastegate valve lift may be mapped to a wastegate duty cycle, where the duty cycle signal is generated by the controller and sent to the wastegate actuator. Mapping to a wastegate duty cycle may include using lookup tables or calculating the wastegate duty cycle. In some other actuators, the wastegate controller determines the duty cycle based on the difference between the desired and actual wastegate positions. A wastegate control (WGC) signal may include pulse width modulation via the wastegate duty cycle to adjust the wastegate. The wastegate valve lift may be achieved by feedforward, feedback, and/or other control algorithms, for example.

A compensation term may account for delays of the wastegate actuator. Additionally, the compensation term may further include adjustments based on movement of twin independent cams, which can affect boost pressure. For example, as the intake cam is moved in a way that would increase boost pressure relative to atmospheric pressure, the magnitude of the compensation term may be decreased. Likewise, as the intake cam is moved in a way that would decrease boost pressure relative to atmospheric pressure, the magnitude of the compensation term may be increased.

Next, at 312, a desired actuator position is determined to achieve the wastegate valve lift determined at 310. The desired actuator position may be fed as an input to various suitable control mechanisms such as those described above. In some embodiments, a desired actuator orientation may be alternatively determined, such as the rotational orientation of a rotating component in the actuator.

Turning now to FIG. 3B, method 300 continues to 314 where a current is applied to the actuator to achieve the desired actuator position determined at 312. In some embodiments, the current may be determined via wastegate dynamics described above, for example.

Next, at 316, it is determined whether a correction for the sensed position of a wastegate valve of the turbocharger is available. The position correction may be sought in an attempt to compensate errors in wastegate valve position sensing due to physical changes in a linkage coupling the wastegate valve to an actuator—for example, thermal deformation (e.g., expansion, contraction, etc.) due to high surrounding temperatures, and deflection due to significant forces imparted to the linkage (e.g., actuator and/or exhaust forces). A plurality of corrections may be stored in a suitable data base (e.g., look-up table, map, etc.) with each correction associated with additional parameters, such as the current supplied to the wastegate valve actuator, the estimated exhaust pressure applied to the wastegate valve at the time the correction was determined, and/or the temperature at the time of correction determination. The temperature may be based on ECT signals described above, for example. Thus, in some embodiments, a position correction may be provided for a given actuator current, exhaust pressure, and/or temperature. If it is determined that a position correction is available for a given actuator and/or temperature (YES), method 300 proceeds to 318. If it is determined that a position correction is not available (NO), the method proceeds to 320.

At 318, a position correction for a sensed wastegate valve position is applied based on the current applied to the actuator or the force applied on the wastegate valve and temperature of the actuator-valve linkage. FIGS. 4A, 4B, and 5 show flowcharts illustrating respective methods for determining a wastegate valve position correction. In particular, a method 400 illustrated by FIGS. 4A and 4B may be used to determine a wastegate valve position correction when the wastegate valve is in contact with its valve seat (e.g., at the fully closed position), which may occur when maximum boost is desired. Method 500 illustrated by FIG. 5 may be used to determine a wastegate valve position correction during execution of a wastegate command instructing the wastegate valve to move toward its valve seat. Thus, a wastegate valve position correction may be determined via method 500 when the wastegate valve is separated from its valve seat and at an at least partially open position. It will be appreciated that additional decision boxes may be added to method 300 to facilitate determination of whether the wastegate valve is at its valve seat or is being moved toward the valve seat based on an issued closing command.

Turning now to FIG. 4A, a flowchart illustrating a method 400 for estimating deflection in an actuator-wastegate valve linkage is shown. Method 400 may be employed in an assembly environment prior to installation of a wastegate in an engine, or may be executed throughout its lifetime of operation as needed to maintain accurate wastegate valve tracking. Method 400 may be used to estimate deflection in linkage 204 of wastegate 200 when wastegate valve 218 is in the fully closed position and in contact with valve seat 220, for example.

At 401 of method 400, it is determined whether operating conditions are conducive to placing the wastegate valve at its fully closed position. Conditions conducive to such placement may include scenarios in which the wastegate valve is already placed at the fully closed position or a fully closed command is being issued to the wastegate. These conditions may occur during engine operation. Other conducive conditions may include choked air flow upstream the compressor of the turbocharger or a deceleration fuel cut off (DFCO) event. If it is determined that conditions are not conducive to placing the wastegate valve at the fully closed position (NO), the method returns to 401. If it is determined that conditions are conducive to placing the wastegate valve at the fully closed position (YES), the method proceeds to 402.

At 402, current is applied to move an actuator (e.g., actuator 202 of FIG. 2) to an actuator position associated with the fully closed position of the wastegate valve. For example, a look-up table may be consulted to derive an actuator position associated with the fully closed position. In other embodiments, current may be applied to the actuator to place one or more components of the actuator at a desired orientation.

Next, at 404, it is determined whether an indicated actuator position is at the position associated with the fully closed position of the wastegate valve. Feedback from one or more sensors indicating the state (e.g., position, rotational orientation, etc.) of the actuator may be evaluated, for example. If the indicated actuator position is not at the position associated with the fully closed position (NO), the method returns to 404. If the indicated actuator position is at the position associated with the fully closed position (YES), the method proceeds to 406.

At 406, holding current is applied to the actuator to overcome exhaust gas force acting against the wastegate valve. The exhaust gas force may act against the wastegate valve in a direction substantially aligned to direction E shown in FIG. 2, for example.

Next, at 408, the holding current is increased by adding a current margin in order to guarantee the wastegate valve sealing. The current margin may increase the applied current beyond a minimum current required to hold the wastegate valve at it's the valve seat. With the wastegate valve maintained at the fully closed position at the valve seat, variations in holding current applied to the actuator above a minimum holding current required to maintain the fully closed position will variably deflect the linkage. Accordingly, sensor measurements will vary as the holding current is varied. Because the fully closed position is maintained as the holding currents are varied in this manner, however, variations in sensor measurements will reflect the degree to which the linkage is deflected. Thus, a sensor measurement corresponding to a particular holding current may be corrected during subsequent wastegate operation as the wastegate valve is moved throughout its range of lifts, based on corrections derived via method 400.

Next, at 410, it is determined whether the indicated actuator position is constant. Here, feedback from a position sensor or other type of sensor may be evaluated. In some embodiments, changes in indicated actuator position below a threshold may be ignored. If the indicated actuator position does not remain constant (NO), the method returns to 410. If the indicated actuator position does remain constant (YES), the method proceeds to 412.

Turning to FIG. 4B, at 412 the current applied to the actuator is read and the temperature of the actuator-valve linkage is inferred. The linkage temperature may be inferred in various suitable ways. For example, the linkage temperature may be inferred based on turbine house or exhaust temperature.

Next, at 414, linkage deflection is determined based on current applied to the actuator or exhaust force applied on wastegate valve, and the linkage temperature inferred at 412. The degree to which the linkage may be thermally deformed may be estimated based on the inferred linkage temperature and known thermal expansion properties of the linkage. Linkage deflection due to actuator and exhaust forces may be estimated based on a linear relation of the following form: $D=mF+b$, where D is linkage deflection, F is force applied to the linkage, and m and b are constants or lookup tables. The force F applied to the linkage may include constituent forces such as actuator and exhaust forces. An additional term may be added to this relation to account for thermal deformation described above, or thermal deformation and force deflection may be considered separately.

Next, at 416, a position correction for the actuator position is determined based on the linkage deflection determined at 414. The linear relation described above may be used to determine the correction, for example. The actuator position correction increases the accuracy of wastegate valve positioning and thus boost control by accounting for linkage deflection and deformation due to imparted forces and high surrounding temperatures.

Finally, at 418, the actuator position correction for the current applied to the actuator and the linkage temperature is stored. In this way, actuator position corrections are associated with corresponding currents and temperatures such that a position correction may be accessed for a given current and/or temperature in a range of currents and temperatures. In some examples, the range may span substantially the entirety of the wastegate operating range. Position corrections, and associated currents and temperatures, may be stored and retrieved in various suitable data bases, including a look-up table or a map, for example in RAM 108 and/or KAM 110 of controller 12 in FIG. 1.

It will be appreciated that method 400 may be modified in various suitable ways without departing from the scope of this disclosure. In some embodiments, a wastegate arrangement for which linkage deflection is to be accounted for may provide a sensor configured to measure the force imparted to the linkage by an actuator. For example, such a force sensor may be substituted for position sensor 224 in FIG. 2. In such a case, the modified method may record a measurement from the force sensor and determine a force correction for a corresponding holding current. Additional force corrections may be determined for a range of desired holding currents and temperatures as similarly described above, which may be encoded in the form of a look-up table or map providing force corrections for given holding currents and temperatures.

Turning now to FIG. 5, a flowchart illustrating an alternative method 500 for estimating deflection in an actuator-wastegate valve linkage is shown. Method 500 may be employed in an assembly environment prior to installation of a wastegate in an engine, or may be executed throughout its lifetime of operation as needed to maintain accurate wastegate valve tracking Method 500 may be used to estimate deflection in linkage 204 of wastegate 200 when wastegate valve 218 is at least partially separated from valve seat 220 and in an at least partially open position, for example.

At 510 of method 500, the fully closed position of a wastegate valve at which a bottom surface of the wastegate valve is in contact with an upper surface of a valve seat is determined, in addition to the actuator current required to maintain the wastegate valve at the fully closed position. The fully closed position and current may be inferred, for example, by tracking feedback from a wastegate valve position sensor and/or the current supplied to an electric actuator operatively coupled to the wastegate valve as the wastegate valve is moved toward the fully closed position. In some scenarios, the rate of change in position sensor feedback may decrease upon reaching the fully closed position, and/or the current supplied to the electric actuator may increase. Such indicators may be used to determine the fully closed position. In some embodiments, fully closed positions previously learned prior to execution of method 500 may be stored in an engine controller (e.g., controller 12) and used as the fully closed position at 510, especially if operating conditions (e.g., desired torque) are not conducive to determination of the fully closed position. For example, recently determined fully closed positions and/or fully closed positions determined for a temperature (e.g., exhaust gas temperature) less than a threshold difference from the current temperature may be used.

Next, at 520, it is determined whether the wastegate valve is at least partially open. If it is determined that the wastegate is not at least partially open (NO), the method returns to 520. If a fully closed position is determined by moving the wastegate valve against its valve seat at 510, the method allows the wastegate to separate from the valve seat until proceeding. The wastegate valve may separate from its valve seat via other wastegate commands or exhaust pressures, for example. Various suitable lift thresholds may define a partially open position—e.g., the wastegate valve may be considered to be partially open at 20% or more of maximum lift. If it is determined that the wastegate valve is at least partially open (YES), method 500 proceeds to 530.

At 530, a closing command is issued to the wastegate based on the current required to maintain the wastegate valve at the fully closed position. The closing command may also specify a relatively low speed at which the wastegate valve is to be moved toward its valve seat.

Next, at 540, it is determined whether a difference between an indicated position and the closing command issued at 530 exceeds a threshold difference. In some embodiments, a plurality of prescribed wastegate valve lifts may be derived directly or indirectly from the closing command. The plurality of prescribed lifts may then be compared to the indicated position (e.g., position sensor feedback from sensor 224) at suitable time intervals to evaluate whether sensor feedback tracks the closing command. Feedback from other types of sensors including force and current sensors may also be utilized, and output from one or both of the sensor and closing command may be converted to various suitable units to facilitate the sensor-command comparison. Further, in some embodiments differences between indicated actuator positions and corresponding prescribed actuator positions may be evaluated. If it is determined that the difference between the indicated position and the closing command does not exceed the threshold (NO), the method returns to 540 to provide continual tracking throughout the duration in which the command is issued. In some examples, closing commands issued at 530 may specify relatively low movement speeds, which may allow thorough comparison of sensor feedback to the issued commands. If instead it is determined that the difference between the indicated position and the closing command does exceed the threshold (YES), the method proceeds to 550.

At 550, a correction for linkage deflection is determined to compensate inaccurate sensor feedback. For embodiments in which a position sensor (e.g., sensor 224) is provided, and prescribed positions may be derived from the closing command, the correction may be a position correction determined based on a difference between the position indicated by the position sensor and the position prescribed by the closing command at a corresponding time point (e.g., at the time at which the difference exceeds the threshold at 540). The position correction may indicate an actual location of the wastegate valve by taking into account deformation or deflection of a wastegate linkage coupling the valve to an actuator. However, suitable corrections for embodiments in which one or both of the sensor output and closing command output correspond to parameters other than wastegate valve lift may be determined in a similar manner. Further, as described above, corrections may be derived for actuator positions alternatively or in addition to wastegate valve positions.

Finally, at 560, the position correction is stored for the applied actuator current and linkage temperature. The position correction and associated current and temperature may be stored in various suitable data bases including look-up tables and maps. In this way, position corrections (e.g., valve position corrections, actuator position corrections, etc.) may be stored for a range of currents and temperatures and retrieved to increase the accuracy of boost control.

Following 560, method 500 ends and returns to 320 of method 300 of FIG. 3. At 320 of method 300, it is determined whether the corrected actuator position is at the desired actuator position. Here, the sensed actuator position corrected by the position correction may be compared to the desired actuator position. In some embodiments, differences between the corrected actuator position and desired actuator position below a threshold may be ignored. If the corrected actuator position is not at the desired actuator position (NO), the method returns to 314. If the corrected actuator position is at the desired actuator position (YES), the method proceeds to 322.

At 322 of method 300, the current applied to the actuator is adjusted to maintain the desired valve lift. The desired valve lift may be maintained via feedback and/or feed-forward control algorithms. For example, valve lift may be controlled via an inner control loop. Thus, the applied current is adjusted when the corrected actuator position reaches a position corresponding to a desired wastegate valve position.

It will be appreciated that method 300 may be modified in various suitable manners. For example, a correction (e.g., position correction) determined via method 400 or 500 may be applied at other regions of method 300. Further, for some wastegate arrangements, the deflection of a wastegate valve-actuator linkage may be a linear function of the following form: $D=(m*F)+b$, where D is the linkage deflection, F is the force applied to the linkage, and m and b are constants. F may include the force imparted to the linkage by an actuator (e.g., actuator 202), and may additionally include exhaust forces acting on the linkage. For embodiments in which a sensor measuring the actuator force applied to the linkage is provided, linkage deflection may be estimated and compensated based on the above linear function and by associating position corrections determined via method 400 or 500 with actuator force values. Alternatively or additionally, for embodiments in which the actuator is an electric motor, the actuator force F (e.g., motor force) may be converted to a current value based on known relations relating motor current to motor force/torque.

In some embodiments, method 300 may include a decision box not shown facilitating determination of whether the physical load on a wastegate valve (e.g., wastegate valve 218) is above a threshold valve load. The valve load may be determined in a substantially direct manner, for example by determining the force imparted to the wastegate valve by an actuator (e.g., actuator 202) and/or the exhaust force imparted by exhaust gasses in a substantially opposed direction (e.g., direction E in FIG. 2). Actuator force imparted to the wastegate valve may be determined based on feedback from a force or current sensor, while the exhaust force may be determined based on feedback from a sensor configured to sense exhaust pressure, for example. Exhaust pressure may alternatively be calculated based on one or more of the signals sent to controller 12 of FIG. 1. Other methods for determining the valve load are possible, including more indirect approaches in which valve load is estimated based on engine load. Determination of whether the physical load on the wastegate valve is above a threshold valve load may prompt determination of position corrections only for operating conditions at which substantial deformation/deflection in the linkage occurs (e.g., temperatures and/or forces above respective thresholds).

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling a wastegate comprising:
a linkage coupled the wastegate valve to an actuator for diverting exhaust gases from an engine to a turbocharger, and a controller having non-transitory instructions to execute of:
applying current to the actuator to move the wastegate valve,
indicating a position of the actuator;
applying a correction to said indicated actuator position compensating for deflection of the linkage based at least on said applied current; and
adjusting said current to be applied to the actuator when said corrected actuator position reaches a position corresponding to a desired wastegate valve position to maintain a wastegate valve lift.

2. The method recited in claim 1 wherein said correction is provided from a stored data base of actuator position corrections for said current applied to said actuator determined during previous test cycles and temperatures of the linkage.

3. The method recited in claim 1 wherein said indicated actuator position is provided from a position sensor coupled to the actuator.

4. The method recited in claim 1 wherein said indicated actuator position is provided from an electrical current supplied to the actuator.

5. The method recited in claim 1 wherein the turbocharger includes a turbine communicating with the gases from an engine exhaust and wherein the valve is positioned in a bypass in parallel with said turbine, and wherein the turbocharger includes an air compressor driven by said turbine and communicating with an air intake of an engine.

6. The method recited in claim 5 wherein a desired position of the actuator is based upon a desired boost from said compressor which in turn is based upon a desired torque output of the engine.

7. The method recited in claim 1 wherein the actuator comprises an electric motor, and wherein the wastegate valve is coupled in a passage leading from upstream of a turbine of the turbocharger to downstream of the turbine.

8. The method recited in claim 7 wherein said electric motor controls lift of the wastegate valve.

9. The method recited in claim 1 wherein the actuator comprises a solenoid.

10. A method of controlling a wastegate comprising:
a linkage coupled the wastegate positioned in a bypass around a turbocharger to an actuator, and a controller having non-transitory instruction to execute of:
applying current to the actuator to move the wastegate valve toward a desired position;
indicating an actuator position;
retrieving a correction for deflection of the linkage from a stored data base created during previous test cycles and based on said applied current and temperature of the linkage;
applying said correction to said indicated actuator position; and
adjusting said current to be applied to the actuator when said corrected actuator position reaches a position corresponding to said desired wastegate valve position.

11. The method recited in claim 10 wherein each of said actuator position corrections was created during said previous test cycles by a procedure comprising: determining a fully closed position of the wastegate valve; when the valve is subsequently in an open position, issuing a closing command current to the actuator; inferring the actuator position based on said closing command current and said determined fully closed position; and creating said position correction based upon a difference between said inferred actuator position and said indicated actuator position.

12. The method recited in claim 11 wherein said fully closed position is determined by a rate of change in said indicated actuator position exceeding a predetermined amount.

13. The method recited in claim 11 wherein said fully closed position is determined when said applied current reaches a predetermined amount.

14. The method recited in claim 11 wherein said indicated actuator position is provided from a position sensor coupled to the actuator.

15. A method of controlling a wastegate comprising:
a linkage coupled the wastegate positioned in a bypass around a turbocharger to an actuator, and a controller having non-transitory instruction to execute of:
applying current to the actuator to move the wastegate valve toward a desired position;
indicating an actuator position;
applying a correction to said indicated actuator position to compensate for linkage deflection based on said applied current;
said actuator position correction created during one or more previous test cycles by a procedure comprising: increasing said applied current to move the wastegate valve to a fully closed position; after the wastegate valve is held in said closed position, further incrementing said applied current to cause deflection in the linkage, wherein a change in said indicated actuator position during said applied current incrementing step is stored as said correction for said deflection; and
adjusting said current to be applied to the actuator when said corrected actuator position reaches a position corresponding to said desired wastegate valve position to maintain a wastegate valve lift.

16. The method recited in claim 15 wherein said stored actuator position corrections are stored in a table or map and each table or map location is accessed by said applied current which caused said deflection during said test cycle and temperature of the linkage during said test cycle.

17. The method recited in claim 15 wherein the turbocharger includes a turbine communicating with an exhaust of an engine and wherein the bypass communicates with said exhaust in parallel with said turbine, and wherein the turbocharger includes an air compressor driven by said turbine and communicating with an air intake of the engine.

18. The method recited in claim 17 wherein a desired position of the actuator is based upon a desired boost from said compressor which in turn is based upon a desired torque output of the engine.

19. The method recited in claim 18 wherein the wastegate valve is moved by said application of current to the actuator to decrease a difference between said desired compressor boost and an actual pressure of compressed air from said compressor.

20. The method recited in claim 18 wherein said desired torque output is based on a driver demanded torque.

* * * * *